United States Patent
Gantert et al.

(10) Patent No.: US 10,492,163 B2
(45) Date of Patent: Nov. 26, 2019

(54) SYSTEMS AND METHODS FOR LEVERAGING MICRO-LOCATION DEVICES FOR IMPROVED TRAVEL AWARENESS

(71) Applicant: JPMorgan Chase Bank, N.A., New York, NY (US)

(72) Inventors: Brian S. Gantert, Hockessin, DE (US); Joseph P. Arnone, Swedesboro, NJ (US); Richard W. McMillen, Media, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 277 days.

(21) Appl. No.: 14/816,300

(22) Filed: Aug. 3, 2015

(65) Prior Publication Data
US 2017/0041759 A1 Feb. 9, 2017

(51) Int. Cl.
| | |
|---|---|
| *H04W 64/00* | (2009.01) |
| *G06Q 20/34* | (2012.01) |
| *H04W 4/029* | (2018.01) |
| *H04W 4/80* | (2018.01) |
| *G06Q 30/02* | (2012.01) |
| *H04W 40/24* | (2009.01) |

(52) U.S. Cl.
CPC ............ *H04W 64/00* (2013.01); *G06Q 20/34* (2013.01); *H04W 4/029* (2018.02); *H04W 4/80* (2018.02); *G06Q 30/0261* (2013.01); *H04W 40/244* (2013.01)

(58) Field of Classification Search
CPC ............... G06Q 30/0261; G06Q 20/20; G06Q 20/3224; G06Q 30/0251; G06Q 30/0205; H04W 4/008; H04W 4/02; H04W 40/244; H04W 4/028; H04W 64/00
See application file for complete search history.

(56) References Cited

U.S. PATENT DOCUMENTS

| | | |
|---|---|---|
| 5,870,721 A | 2/1999 | Norris |
| 5,940,811 A | 8/1999 | Norris |
| 6,105,107 A | 8/2000 | Ho et al. |
| 7,370,004 B1 | 5/2008 | Patel et al. |
| 8,532,370 B2 | 9/2013 | Sasaki |
| 9,152,477 B1 | 10/2015 | Campbell et al. |
| 2006/0287813 A1* | 12/2006 | Quigley ............... G01S 5/02 701/533 |

(Continued)

*Primary Examiner* — Margaret G Mastrodonato
(74) *Attorney, Agent, or Firm* — Greenberg Traurig LLP

(57) ABSTRACT

Systems and methods for leveraging micro-location devices for improved travel awareness are disclosed. In one embodiment, a system for performing a location-based action in a network of micro-location devices may include a plurality of micro-location devices, each micro-location devices associated with a unique identifier and a location, each of the plurality of micro-location devices transmitting a signal comprising its associated unique identifier; a backend in communication with a database, the database storing the unique identifier and location associated with each of the micro-location devices; and a mobile device that receives a signal comprising a unique identifier from one of the plurality of micro-location devices and communicates the unique identifier to the backend. The backend may determine a mobile device location based on the unique identifier received from the mobile device and may perform an action based on the mobile device location.

18 Claims, 2 Drawing Sheets

(56) References Cited

U.S. PATENT DOCUMENTS

| | | | |
|---|---|---|---|
| 2010/0022254 A1* | 1/2010 | Ashfield | G06Q 20/3224 |
| | | | 455/456.6 |
| 2011/0028160 A1* | 2/2011 | Roeding | G06Q 30/00 |
| | | | 455/456.1 |
| 2011/0047075 A1* | 2/2011 | Fourez | G06Q 20/32 |
| | | | 705/44 |
| 2015/0073980 A1* | 3/2015 | Griffin | H04W 4/008 |
| | | | 705/39 |
| 2015/0170256 A1* | 6/2015 | Pettyjohn | G06Q 30/0639 |
| | | | 705/14.49 |
| 2015/0248702 A1* | 9/2015 | Chatterton | G06Q 30/0261 |
| | | | 705/14.58 |
| 2016/0012496 A1* | 1/2016 | Hanson | H04W 4/02 |
| | | | 705/323 |
| 2016/0335640 A1* | 11/2016 | Howe | H04W 4/029 |

* cited by examiner

SYSTEMS AND METHODS FOR LEVERAGING MICRO-LOCATION DEVICES FOR IMPROVED TRAVEL AWARENESS

BACKGROUND OF THE INVENTION

1. Field of the Invention

The present invention generally relates to systems and methods for leveraging micro-location devices for improved travel awareness.

2. Description of the Related Art

Micro-location devices, such as beacons, are becoming more and more popular. Micro-location devices may use Bluetooth Low Energy (BLE), a technology that has been included in many mobile devices since as early as 2010. To receive a transmission from a micro-location device, no special equipment is required so long as the device is capable of receiving BLE transmissions.

Micro-location devices may be used to identify the location of a use's mobile device. Although similar information may be received from a device's Global Positioning System (GPS) sensor, this needs a clear view of the sky, and uses a considerable amount of power, which can drain the battery. Cellular triangulation may also be used, but that may give a rough location, such as within half a mile. It may also require data from the cellular providers. Finally, RFID and NFC may provide some of the functions of a micro-location device, but require specialized scanners and require the user to present the RFID or NFC tag to the reader to be effective.

SUMMARY OF THE INVENTION

Systems and methods for leveraging micro-location devices for improved travel awareness are disclosed. In one embodiment, a system for performing a location-based action in a network of micro-location devices may include a plurality of micro-location devices, each micro-location devices associated with a unique identifier and a location, each of the plurality of micro-location devices transmitting a signal comprising its associated unique identifier; a backend in communication with a database, the database storing the unique identifier and location associated with each of the micro-location devices; and a mobile device that receives a signal comprising a unique identifier from one of the plurality of micro-location devices and communicates the unique identifier to the backend. The backend may determine a mobile device location based on the unique identifier received from the mobile device and may perform an action based on the mobile device location.

In one embodiment, the signal may be a Bluetooth low energy signal.

In one embodiment, action based on the mobile device location may include updating a location for a user of the mobile device.

In one embodiment, the micro-location devices may be part of a tablet computer, an automated teller machine, etc.

In one embodiment, the backend may determine the mobile device location based on a strength of the signal received by the mobile device.

In one embodiment, the system may further include a rules engine that applies business rules to determine an offer or information to push to the mobile device based on the mobile device location.

Methods for performing a location-based action in a network comprising a plurality of micro-location devices, each micro-location device broadcasting a signal comprising a unique identifier are disclosed. In one embodiment, a method may include (1) a backend comprising at least one computer processor receiving a unique identifier that is associated with and broadcast as a signal by one of a plurality of micro-location devices and received by a mobile application executed by a mobile device and a user identifier that is associated with a user of the mobile application; (2) the backend retrieving a micro-location device location from a database based on the unique identifier; (3) the backend determining a mobile device location based on the micro-location device location; and (4) the backend performing an action based on the mobile device location.

In one embodiment, the action may include the backend retrieving a message to provide to the mobile application based on the mobile device location; and the backend pushing the message to the mobile application.

In another embodiment, the action may include the backend adjusting a spending profile for an account associated with the user identifier based on the mobile device location. The account may be a financial transaction account.

In another embodiment, the action may include the backend updating a location history database to improve transaction authorization rules and fraud detection.

In one embodiment, the backend may further determine the mobile device location based on a strength of the signal received by the mobile device.

In one embodiment, the backend may further provide a third party with the user identifier and the mobile device location.

In one embodiment, the method may include the backend receiving a second unique identifier that is associated with and broadcast as a second signal by a second micro-location device and received by the mobile application; the backend retrieving a second micro-location device location from a database based on the second unique identifier; the backend updating the mobile device location based on the second micro-location device location; and the backend performing a second action based on the updated mobile device location.

In one embodiment, the first action may include adding an account associated with the user identifier to a location history database, and the second action may include updating an account status in the database and taking an action based on at least one business rule.

According to another embodiment, a method for performing a location-based action in a network comprising a plurality of micro-location devices, each micro-location device broadcasting a signal comprising a unique identifier may include (1) a backend comprising at least one computer processor receiving a first unique identifier that is associated with and broadcast as a first signal by a first micro-location device and received by a mobile application executed by a mobile device and a user identifier that is associated with a user of the mobile application; (2) the backend retrieving a first micro-location device location from a first database based on the first unique identifier, wherein the first database comprises a mapping of a unique identifiers to a micro-location device location; (3) the backend receiving a second unique identifier that is associated with and broadcast as a second signal by a second micro-location device and received by the mobile application; (4) the backend retrieving a second micro-location device location from the first database comprising based on the second unique identifier; (5) the backend determining a direction of travel of the mobile device based on the first micro-location device location and the second micro-location device location; (6) the backend retrieving, from a second database, content based on the direction of travel of the mobile device, wherein the second database comprises location-specific content; and (7) the backend pushing the content to the mobile application.

In one embodiment, the content may include information regarding at least one service.

In one embodiment, the method may further include the backend updating a location history database for the mobile device.

In one embodiment, the backend may provide a third party with the user identifier and the mobile device location.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
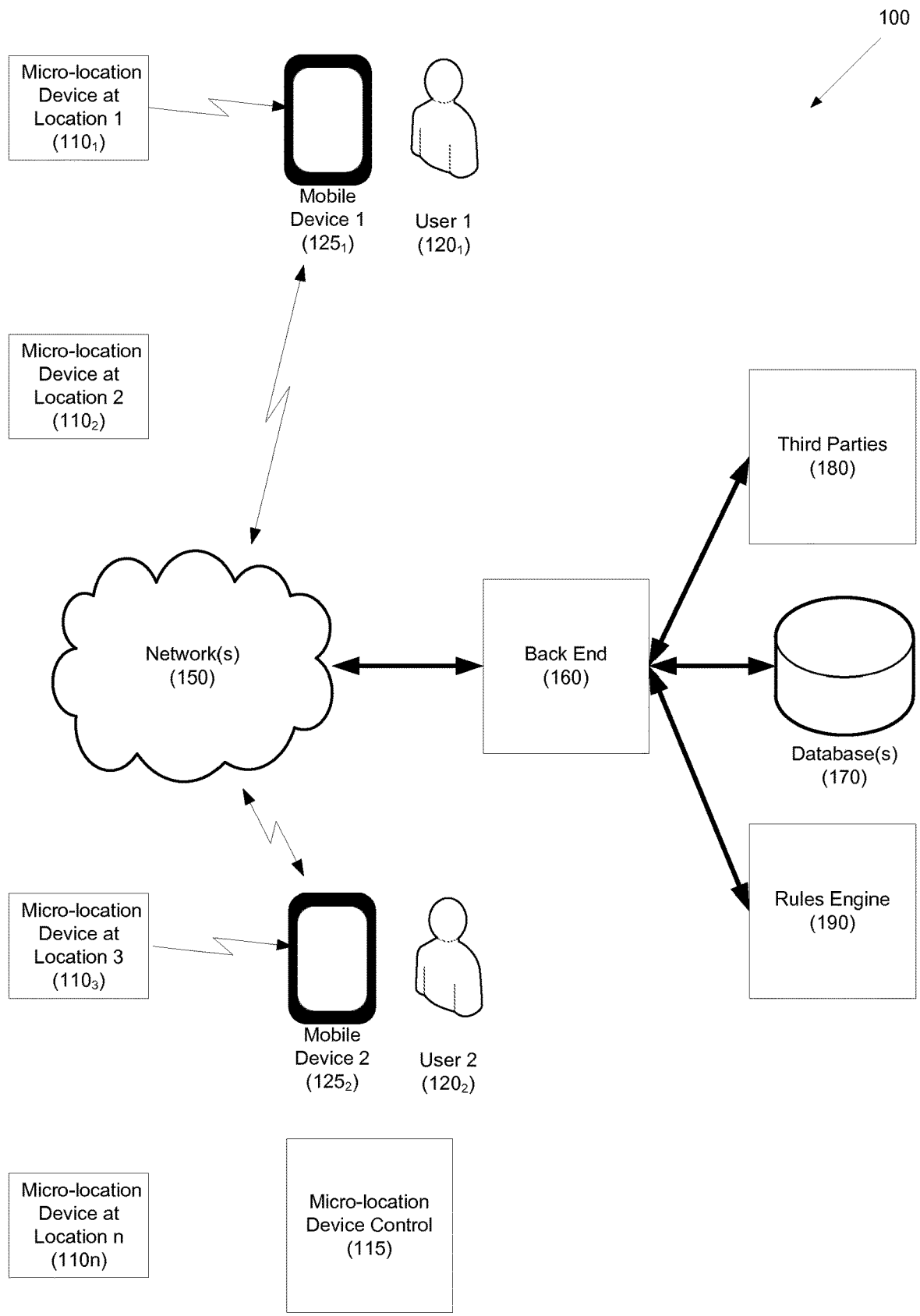
FIG. 1 depicts a system for leveraging micro-location devices for improved travel awareness according to one embodiment.
Figure 2:
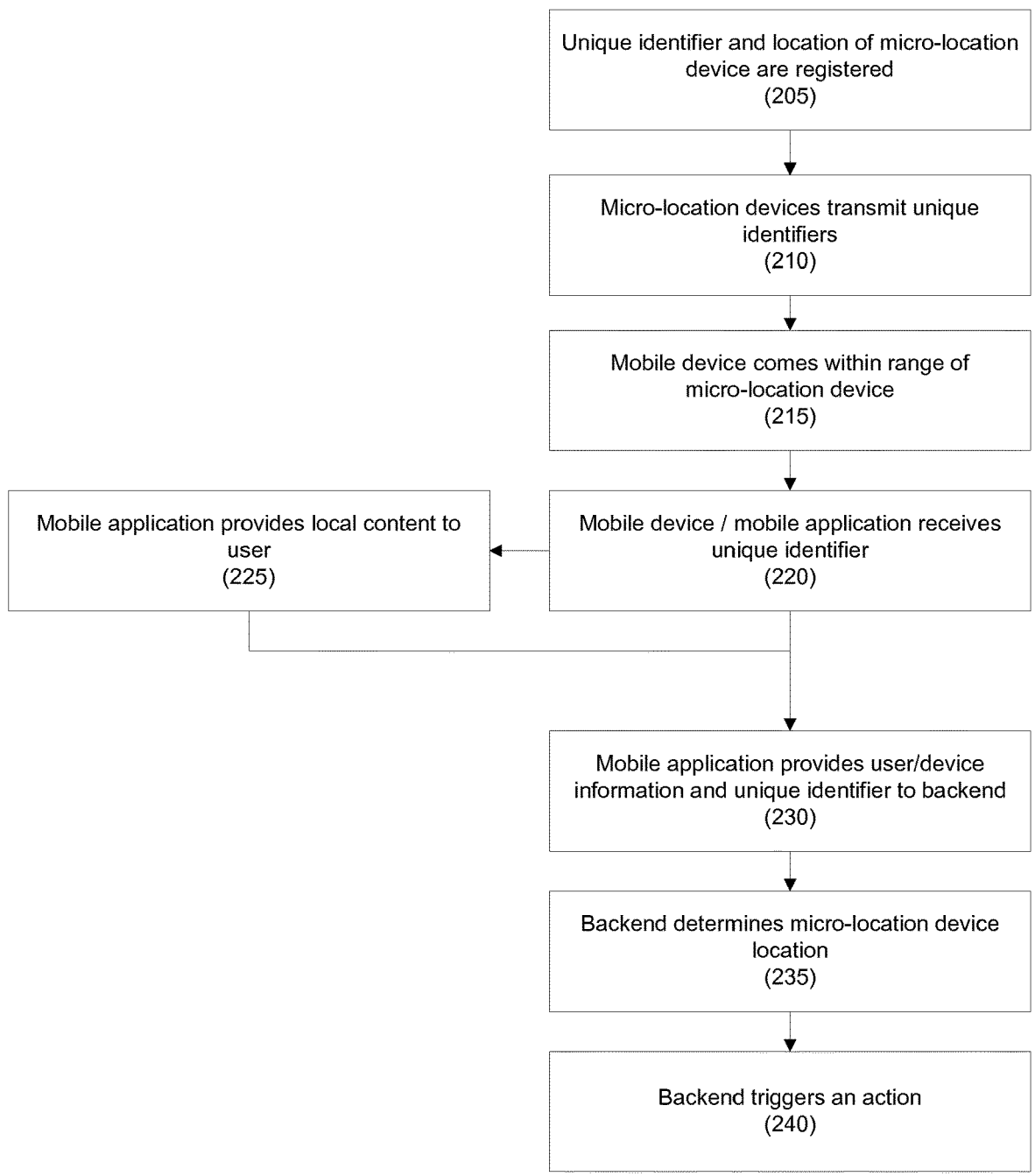
FIG. 2 depicts a method for leveraging micro-location devices for improved travel awareness according to one embodiment.

Several embodiments of the present invention and their advantages may be understood by referring to FIGS. 1-2.

Embodiments disclosed herein relate to the use of micro-location identification technology, such as Bluetooth Low Energy (BLE) beacons, WiFi beacons, or similar technology, to interact with a user's mobile or wearable devices to identify when and where a user's mobile device enters and exits a location. For example, the systems and methods may be used to detect when a user's mobile device arrives at a travel port, such as a departing airport, and may be used to deliver enhance services and push relevant content notices, offers, information, etc. to that mobile device that may enhance the user's travel experience. The mobile device's location may also be used to update customer location records and provide awareness that the user is traveling in order to adjust a financial institution's location-based risk and fraud parameters, a user's location-based spending preferences, customer service/support, etc. for the user.

The system and method may leverage additional data to identify a home location which may be used for a trip departure. Data may include user profile information, such as home address, spend patterns based on the user's accounts (e.g., credit cards, debit cards, etc.), data available when the user's travel is purchased using bank accounts, and user-provided travel notifications.

If the mobile device is then detected at a second travel port, such as an arriving airport, the mobile device's location may then be updated, and relevant content, notifications, offers, information, etc. for the second travel port may be pushed to the mobile device, and may be tailored for that location (e.g., information on finding nearby services). In addition, the financial institution's fraud parameters, spending preferences, etc. for the user may be updated. For example, upon determining that the user's device is now located at a new location, the risk and fraud parameters may be adjusted to permit spending in the area of the second travel port without triggering a location-based fraud alert or being put on a fraud watch.

Referring to FIG. 1, a system for leveraging micro-location devices for improved travel awareness according to one embodiment is disclosed. System 100 may include a plurality of micro-location devices (or beacons) $110_1$, $110_2$, $110_3$, . . . $110_n$, mobile devices $125_1$, $125_3$, etc., network(s) 150, backend 160, database(s) 170, and third parties 180. Micro-location devices 110 may be any suitable type of micro-location device, such as Bluetooth Low Energy (BLE) micro-location devices, WiFi micro-location devices, WiFi Aware, etc. An example of a suitable micro-location device is a micro-location device using Apple's iBeacon protocol and Google's Eddystone.

In one embodiment, BLE micro-location devices may be preferable to GPS, WiFi, and cellular triangulation because BLE micro-location devices use less energy and do not require third party data, such as data from cellular providers, work indoors, do not require network connectivity, and can provide a granular micro-location. In addition, because this is mostly a passive technology, little or no intervention is required from the user in order to receive the micro-location device, other than device settings and app permissions.

In one embodiment, micro-location devices 110 may be deployed as stand-alone devices, or with the technology embedded in other device, such as mobile devices (e.g., tablet computers, such as Apple iPads, notebook computers, etc.), ATMs, kiosks, network access points, etc. In one embodiment, other mobile devices, such as a smart phone, may be used as a micro-location devices as well. Any sort of suitable device may be used as is necessary and/or desired, and may include third party managed micro-location devices.

Each micro-location device 110 may broadcast a unique identifier to a plurality of mobile devices 125. Thus, unlike a representative that may try to interact with passing passengers, in one embodiment, the unique identifier may be broadcast to all mobile devices 125 with the range of micro-location device 110 without requiring user interaction.

In one embodiment, micro-location device control engine 115 may communicate with one or more of micro-location devices $110_1$, $110_2$, $110_3$, . . . $110_n$ and may manage each micro-location device's unique identifier, etc. as is necessary and/or desired. Micro-location device control engine 115 may communicate with one or more micro-location device $110_1$, $110_2$, $110_3$, . . . $110_n$ via network(s) 150, by a separate network (not shown), directly, etc.

Even though the unique identifier may be broadcast, it may not necessarily be received or processed by mobile devices 125. This may depend on user preference, whether the device detects the signal, and whether the device delivers it to an enabled application.

In one embodiment, the unique identifiers may be registered with backend 160 (e.g., the provider of a mobile application that interacts with backend 160, etc.), third party 180, with the micro-location device owner or party that deployed the micro-location device, etc. and may identify a physical location of the micro-location device.

Micro-location devices 110 may be distributed among a plurality of locations. For example, an airport may have a plurality of micro-location devices 110 deployed, such as at ticketing/check-in, at gates, at baggage claim, at ground transportation, etc. A similar network of micro-location devices 110 may be deployed at each location. In one embodiment, the system may leverage the ability of micro-location devices to broadcast a hierarchy of location data (e.g., city, airport, terminal gate, etc.).

A plurality of users 120 and a plurality of mobile devices 125 may receive the broadcasts from micro-location devices 110. Mobile device 125 may be, for example, a smart phone, a tablet computer, a wearable device (e.g., a fitness tracker, smart watch, etc.), a notebook computer, etc., that can receive the broadcast and unique identifier from micro-location devices 110, including devices the operate using the iOS operating system, the Android operating system, etc.

In one embodiment, mobile device 125 may execute a mobile application (not shown) that may receive and process the unique identifier. For example, the mobile application may be a financial institution's mobile application that may interact with backend 160. The mobile application may receive the unique identifier from micro-location devices 110 and may provide that identifier to backend 160 and/or to a third party 180, to a financial institution, etc.

In one embodiment, mobile device 125 may launch the mobile application in response to a broadcast from micro-location device 110.

In one embodiment, the number of micro-location devices 110, the location of micro-location devices 110, and the signal strength of each micro-location device 110 may be based on a desired accuracy of the locations of mobile devices 125. The deployed micro-location devices may be set with a signal strength that improves location accuracy (e.g., low power signal (1 meter), higher location accuracy, vs. higher power signal (e.g., 70 meters, lower location accuracy). Location accuracy may be driven by the mobile application and interpretation of detected signal strength. In one embodiment, the mobile device and/or mobile application may triangulate signals of multiple micro-location devices in order to improve location accuracy. Other data, such as profile information, along with airport gate departure information, may be used to anticipate user 120's next location. This may necessitate a network with a large number of micro-location devices 110.

Alternatively, micro-location device 110 may be set to have a greater range (e.g., 100 meters) so that mobile device 125 receives a unique identifier micro-location device 110 is within the general area of micro-location device 110. Such a network may not require as many micro-location devices 110, but may not provide the same degree of accuracy.

It should be recognized that these ranges are exemplary only and the characterization of the ranges (e.g., short, greater) is not limiting. Any suitable range or ranges may be used as is necessary and/or desired.

Although the placement of micro-location devices 110 has been discussed in the context of airports, it should be recognized that micro-location devices 110 may be placed in any suitable location as is necessary and/or desired. For example, micro-location devices 110 may be used at transportation ports (e.g., airports, train stations, train routes, bus terminals, ship ports, taxi stands, bus stations, shuttles, car rental facilities, charging stations, etc.), public transportation (e.g., planes, trains, busses, taxis, etc.), lodging, gas stations, supermarkets, shopping malls, stores, banks, theme parks, toll plazas, travel plazas, interstates, weigh stations, rest areas, etc. The location and number of micro-location devices 110 may be selected as is necessary and/or desired.

When mobile device 125 receives a unique identifier from micro-location device 110, it may communicate that unique identifier to backend 160 via network(s) 150. Network(s) 150 may include any suitable network or combination of networks, including wired networks, LANs, WANs, VPNs, the Internet, cellular networks, satellite networks, etc. Any suitable communication network or networks may be used as is necessary and/or desired.

Backend 160 may communicate with, for example, database(s) 170, third parties 180, etc. For example, backend 160 may communicate with, or be part of, a financial institution.

It may communicate with transportation providers (e.g., airlines to get gate information), transportation networks, etc. It may also receive a GPS location of mobile devices 125 to supplement and/or confirm the locations of mobile devices 125.

Databases 170 may store location data and unique identifiers for micro-location devices 110, such as a mapping between each unique identifier and a physical location of the micro-location device. Database(s) 170 may store information regarding the micro-location devices themselves (e.g., manufacturer, type, range, etc.) They may also store customer profile information, offer information, business rules, etc. in order to deliver relevant offers, content, notifications, and/or information about the location, etc. For example, backend 160 and database(s) 170 may comprise content/offers/notifications that provide (1) improved travel experiences (e.g., enhanced transaction authorizations without needing to contact a financial institution to inform it of travel plans; communications from a provider (e.g., "Thank you for flying United Airlines"); connecting gate information; ground transportation information; etc.); (2) travel related financial services (e.g., location of nearest branch, ATM, etc.); (3) offers and location-specific content (e.g., discounts for dining, transportation, etc.; weather information); (4) other uses (e.g., tracking the number of visits to an airport, etc.).

In one embodiment, rules engine 190 may be provided. Rules engine 190 may drive various marketing offers and content as well as risk based rules such as fraud strategies, spend limits, transaction authorizations etc. Data captured and stored in the database(s) 170, such as location history, may be leveraged by Rules Engine 190.

In one embodiment, database(s) 170 may store customer information. For example, if database(s) 170 are under control of a financial institution, database(s) may store customer account information, customer preferences, customer account data, etc.

In one embodiment, database(s) 170 may capture, store and track user location information. This information may be used by fraud and transaction authorization engines for example, to determine normal and abnormal travel patterns for the user, etc.

Database(s) 170 may store any other information that is necessary and/or desired.

In one embodiment, third party 180, such as a financial institution, may use the location information for mobile device 125 to update its fraud parameters, spending preferences, etc. for user 120. Thus, user 120 may not need to specifically inform the financial institution of his or her whereabouts to areas that otherwise may trigger a fraud alert.

Referring to FIG. 2, a method for leveraging micro-location devices for improved travel awareness according to one embodiment is disclosed. It should be recognized that, although the method may be presented in a particular order, any suitable order may be used as is necessary and/or desired.

In step 205, a micro-location device, such as a BLE beacon, may be registered with a backend, a micro-location device provider, a third party, etc. In one embodiment, the micro-location device's unique identifier and location may be registered. In one embodiment, other information, such as the micro-location device's range, may also be registered.

In step 210, each micro-location device may broadcast its unique identifier.

In one embodiment, the unique identifiers may be refreshed periodically or as otherwise desired to mitigate the risk of the misuse of the unique identifiers. Other functionality to mitigate the risk of misuse of the unique identifiers, micro-location devices, etc. may be employed as is necessary and/or desired.

In one embodiment, the micro-location device identifier may further include content that may be displayed by the mobile application.

In step 215, a mobile device may come within the broadcast range of one or more micro-location device.

In step 220, the mobile device and/or mobile application may receive the unique identifier from a micro-location device. In one embodiment, the mobile application may be required to be running in order for the mobile application to receive the unique identifier. In another embodiment, the receipt of the unique identifier may cause the mobile device to launch the mobile application if it is not already running.

In one embodiment, in step 225, the mobile application may provide a local notification based on the receipt of the unique identifier and/or additional information broadcast by the micro-location device. For example, the receipt of the unique identifier may cause the mobile application to display a message or information (e.g., "Welcome to BWI", an airport map, etc.) without interaction with the backend. The receipt may also cause the mobile application to display local dynamic information, such as the weather, but may require network connectivity to display this information in real time.

In one embodiment, the mobile application may associate the unique identifier with information or a message that was previously presented in response to the receipt of that unique identifier, and may present that message independent of the backend.

In step 230, the mobile application may communicate information regarding the mobile device and/or user (e.g., mobile device identifier, user account information, username, etc.) and the unique identifier to a backend, such as a backend for the mobile application. In embodiment, this may be communicated using any suitable communication channel, including cellular, WiFi, etc.

In step 235, the backend may the unique identifier and mapping in the database to determine the location of the micro-location device. In one embodiment, the backend may base the selection of content, notifications, offers, etc. on the mobile device's proximity to the backend.

In step 240, the backend may trigger an action based on the location of the mobile device. In one embodiment, the backend may retrieve location-specific content to push to the mobile device, such as welcome messages, area information, directions, etc. In one embodiment, the backend may consider other information about the user in order to personalize the content, offers, information, etc. For example, the backend may determine from an airline third party the departure gate, connecting gate, etc. It may provide directions to a financial institution's closest ATM. It may inform the user of awaiting ground transportation. It may push offers, such as free WiFi, in exchange for applying for a credit card. Any sort of suitable content, offers, information, etc., (personalized or not) may pushed to the mobile device as is necessary and/or desired.

Information about the user may be used to provide personalized communications. For example, the user's account profile, travel status, spending profile, specific airport locations, prior visits/activity at airport, whether the user is arriving or departing, and other data may be used to generate and present targeted offers or messaging.

In one embodiment, as the mobile device detects additional micro-location devices, the user's direction of travel may be determined, and information that is targeted to the user's direction of travel may be presented. For example, if the user is walking through a terminal and has the mobile device has detected a micro-location device at gate A5, another micro-location device at gate A7, and another micro-location device at gate A9, information and/or offers based on this direction of travel (e.g., for restaurants, ATMs, services near gate A11) may be provided to the mobile device.

The disclosure of U.S. patent application Ser. No. 15/561,837, filed Dec. 5, 2014 and entitled "System and Method for Providing Travel Assistance" is incorporated, by reference, in its entirety.

In one embodiment, offers that are presented may be offers for instant credit with a financial institution. In one embodiment, an application for instant credit may be pushed to the mobile device and completed using the mobile device. In exchange for submitting an application, the user may be provided with an incentive, such as free in-flight WiFi, discounts, etc.

The disclosures of U.S. Pat. Nos. 5,870,721; 5,940,811; 6,105,107; 7,370,004, and 8,532,370, and U.S. patent application Ser. Nos. 13/803,298; and 14/744,608 are hereby incorporated by reference in their entireties.

In another embodiment, the backend may provide information, such as the mobile device location information and user information, to a third party, such as an airline, an airport, etc. In one embodiment, the backend may be part of a third party. For example, the backend and/or third party may be a financial institution.

In one embodiment, the third party may take one or more action based on the location information. For example, if the mobile device indicates a new location, the user's location may be updated for fraud detection and prevention, along with reducing the number of valid transactions that are declined at point of sale (POS) devices. It may update the user's travel status, and whether the travel is domestic or international. If the user has different spending preferences based on the user's location, those preferences may be activated. The location may further be used to push location-specific content, offers, and information to the user. Any other suitable action may be taken based on the location information as is necessary and/or desired.

In one embodiment, when a mobile device and/or mobile application detects a micro-location device, the data (e.g., micro-location device's unique identifier, time, etc. etc.) may be stored locally on the mobile device if there is no connectivity and data cannot be transmitted real time to the backend. Data may then be transmitted to the backend when connectivity is available. This may be helpful in tracking number of visits to a location or in fraud prevention.

The following disclosures are incorporated, by reference, in their entireties: U.S. patent application Ser. No. 12/891,344, filed Sep. 27, 2010, U.S. patent application Ser. No. 13/803,298, filed Mar. 14, 2013, U.S. Provisional Patent Application Ser. No. 61/831,358, filed Jun. 5, 2013; and U.S. patent application Ser. No. 13/930,494, filed Jun. 38, 2015.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote-memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Objective-C, Swift, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for performing a location-based action in a network of micro-location devices, comprising:
    a plurality of micro-location devices, each micro-location devices associated with a unique identifier and a location, each of the plurality of micro-location devices transmitting a signal comprising its associated unique identifier;
    a backend in communication with a database, the database storing the unique identifier and location associated with each of the micro-location devices;
    a mobile electronic device that receives a signal comprising a unique identifier from one of the plurality of micro-location devices and communicates the unique identifier to the backend; and
    a credit card or debit card associated with a transaction account;
    wherein the backend determines a mobile electronic device location based on the unique identifier received from the mobile electronic device;
    wherein the backend updates a stored mobile electronic device location with the determined mobile electronic device location for the transaction account associated with the mobile electronic device; and
    wherein the updated stored mobile electronic device location is used to authorize a pending transaction involving the credit card or debit card by comparing the updated stored mobile electronic device location to a location for the pending transaction.

2. The system of claim 1, wherein the signal is a Bluetooth low energy signal.

3. The system of claim 1, wherein at least one of the plurality of micro-location devices is part of a tablet computer.

4. The system of claim 1, wherein at least one of the plurality of micro-location devices is part of an automated teller machine.

5. The system of claim 1, wherein the backend further determines the mobile electronic device location based on a strength of the signal received by the mobile electronic device.

6. The system of claim 1, further comprising:
a rules engine that applies business rules to determine an offer or information to push to the mobile electronic device based on the mobile electronic device location.

7. The system of claim 1, wherein the pending transaction is permitted when the location for the transaction is within a threshold of the stored mobile electronic device location.

8. The system of claim 1, wherein the pending transaction is prohibited when the location for the transaction is outside a threshold of the stored mobile electronic device location.

9. A method for performing a location-based action in a network comprising a plurality of micro-location devices, each micro-location device broadcasting a signal comprising a unique identifier, comprising:
a backend comprising at least one computer processor receiving a unique identifier that is associated with and broadcast as a signal by one of a plurality of micro-location devices and received by a mobile computer application executed by a mobile electronic device and a user identifier that is associated with a user of the mobile computer application;
the backend retrieving a micro-location device location from a database based on the unique identifier;
the backend determining a mobile electronic device location based on the micro-location device location; and
the backend updating a stored mobile electronic device location with the determined mobile electronic device location for a transaction account associated with the mobile electronic device;
wherein the updated stored mobile electronic device location is used to authorize a pending transaction involving a credit card or debit card associated with the transaction account by comparing the updated stored mobile electronic device location to a location for the pending transaction.

10. The method of claim 9, further comprising:
the backend retrieving a message to provide to the mobile computer application based on the mobile electronic device location; and
the backend pushing the message to the mobile computer application.

11. The method of claim 9, wherein the account is a financial transaction account.

12. The method of claim 9, wherein the action comprises:
the backend updating a location history database to improve transaction authorization rules and fraud detection.

13. The method of claim 9, wherein the backend further determines the mobile electronic device location based on a strength of the signal received by the mobile electronic device.

14. The method of claim 9, wherein the backend further provides a third party with the user identifier and the mobile electronic device location.

15. The method of claim 9, further comprising:
the backend receiving a second unique identifier that is associated with and broadcast as a second signal by a second micro-location device and received by the mobile computer application;
the backend retrieving a second micro-location device location from a database based on the second unique identifier;
the backend updating the mobile electronic device location based on the second micro-location device location; and
the backend updating the stored mobile electronic device location based on the updated mobile device location.

16. The method of claim 15, wherein the first action comprises adding an account associated with the user identifier to a location history database, and the second action comprises updating an account status in the database and taking an action based on at least one business rule.

17. The method of claim 9, wherein the pending transaction is permitted when the location for the transaction is within a threshold of the stored mobile electronic device location.

18. The method of claim 9, wherein the pending transaction is prohibited when the location for the transaction is outside a threshold of the stored mobile electronic device location.

* * * * *